Figure 1:
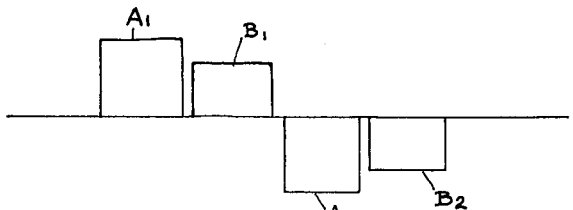

Nov. 23, 1965

J. M. BRICAUD

ELECTRICAL PULSE LOGGING METHOD WITH RESIDUAL POTENTIAL COMPENSATION

Filed March 14, 1962

3,219,921

2 Sheets-Sheet 1

United States Patent Office 3,219,921
Patented Nov. 23, 1965

3,219,921
ELECTRICAL PULSE LOGGING METHOD WITH RESIDUAL POTENTIAL COMPENSATION
Joseph Marie Bricaud, Suresnes, France, assignor to Societe de Prospection Electrique, Procedes Schlumberger, Paris, France, a corporation of France
Filed Mar. 14, 1962, Ser. No. 181,227
Claims priority, application France, May 29, 1957, 739,720, Patent 1,177,062
4 Claims. (Cl. 324—1)

This application is a continuation-in-part of my application Serial No. 736,621, filed May 20, 1958, now abandoned.

This invention relates to improved electrical prospecting methods, and more particularly to a method for measuring the apparent resistivity of a geological formation surrounding a bore hole or the like.

It is a well known fact that the apparent resistivity of a geological layer may be measured utilizing a four electrode system extending into the bore hole. With such an arrangement, two of the electrodes serve to provide an electric current through the bore hole and adjacent layers of the surrounding earth formations, while the two remaining electrodes are connected to a voltage measuring instrument adapted to indicate the value of the potential produced by the passage of the current from the first pair of electrodes to the second pair. By means of Ohm's law, the resistance between the first and second pairs of electrodes may be calculated from the known values of current and potential, and hence the resistivity (resistance per cubic centimeter) of the medium may be derived.

Where the electrode system is immersed in an unlimited, homogeneous medium having a constant electrical resistivity, the voltage value thus obtained corresponds to the actual resistivity of the earth formation. In the usual case, however, the medium is not homogeneous and the resistivity which is calculated in this manner is not quite the same as the actual resistivity of the surrounding geological layers. It is the value of this latter resistivity which one desires to ascertain, and we may therefore refer to the resistivity calculated in the manner described above as the "apparent" resistivity.

For a given system of four electrodes, the apparent resistivity measured is a compound function of the resistivity of the sludge in the bore hole and the resistivity of one or more of the geological layers lying in the vicinity of the point at which the electrodes are immersed, the data governing the compound function depending upon the shape of the electrode system used. It is thus apparent that when different values of the apparent resistivity are measured at the same point through the agency of arrangements having different structures, the results obtained are different, and through their comparison it is possible to obtain much more precise knowledge of the actual resistivity of the surrounding geological layers.

At the present time, the measurements accompanying electrical core sampling include generally two simultaneous measurements of different apparent resistivities, the comparison between which provides extremely valuable indications. One of these measurements is performed with the electrode system disposed in what is called the "normal" probe arrangement, i.e., one of the current supply electrodes being located at a point comparatively near one of the voltage measuring electrodes, while the two remaining electrodes are comparatively wide apart from each other and spaced away from the system including the first two electrodes. The other resistivity measurement is obtained with the electrodes disposed in what is known as the "reversed" or "lateral" probe arrangement, wherein two of the electrodes, either those serving for the measurement or those serving for the current supply, are comparatively near each other, while the two remaining electrodes are comparatively wide apart and spaced with reference to the first two electrodes. The voltages arising spontaneously inside the bore hole are also generally measured through one of the electrodes.

As is well known, in general the resistivity curves provided by the normal electrode arrangement provide information about the formations close to and adjacent the bore hole while the lateral curves, i.e., those provided by the lateral or reversed probe arrangement, provides information concerning the resistivity of formations at greater distances from the bore hole. For each type of probe arrangement, there are, of course, different electrode spacings, providing curves indicative of different conditions of the surrounding geological strata.

While the normal and lateral probe measurements are usually described as being made simultaneously within the bore hole, in actual practice, a switching arrangement periodically connects the electrodes of the system first into one arrangement and then into the other during each cycle of operation. In addition, in order to cut out or eliminate the disturbing action of the spontaneous potentials generated in the bore hole on these measurements, the direction of the current pulses supplied to the earth formations and the polarities of the voltage measuring electrodes are periodically and simultaneously reversed, whereby the spontaneous potentials are averaged out in consecutive measurements. The above described switching action may be carried out by conventional gang switching means, such as shown in Patent No. 2,728,047, issued December 20, 1955, to Doll.

Broadly speaking, the present invention contemplates use of the four conventional electrodes arranged in the ordinary manner, but with at least eight different switching positions instead of the usual four.

Although the prior art switching arrangement described above serves to eliminate the effect of spontaneous potentials in the bore hole, there may also occur inside the bore hole differences in voltage which continue after a current pulse and which are in the same or opposite direction to the voltage being measured. These delayed or residual potentials may result from factors within the bore hole and the surrounding geologic formations such as condensation, polarization of the sludge or layers, or the like, and introduce errors into the measurement which, in certain cases, may be considerable.

Accordingly, it is the object of this invention to provide a novel method of resistivity measurement in a bore hole in which the errors introduced by such delayed or residual potentials are automatically balanced out.

Briefly, in accordance with the present invention, the current pulses provided by the system when operating as, for example, a normal probe arrangement, are separated in time to allow for the current pulses provided for operation of the system in the lateral probe arrangement. In accordance with the conventional operation, the current pulses corresponding to the normal probe measurement will alternate in polarity, however, the polarity of the pulses associated with the lateral mode measurement, instead of changing alternately in the manner of the normal probe pulses will change only once for each two successive occurrences. In other words, the current pulses for the lateral probe measurement will consist of a pair of pulses of one polarity followed by a pair of pulses of the opposite polarity, and so on. By means of this novel pulse arrangement, the above described residual potentials are balanced out and the resultant measurements made by the system are consequently more precise.

Figure 2:
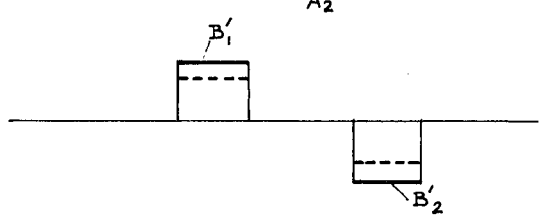
Figure 2:
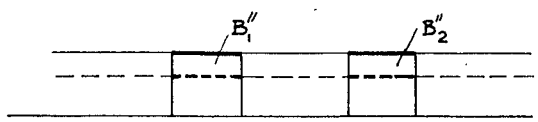
Figure 3:
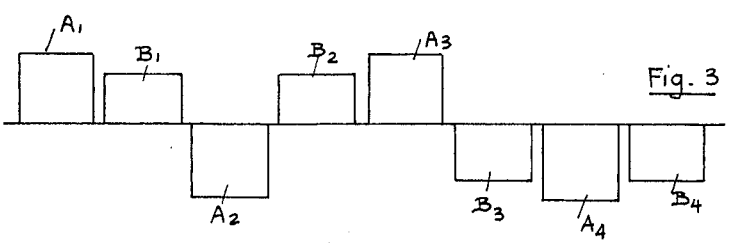
Figure 4:
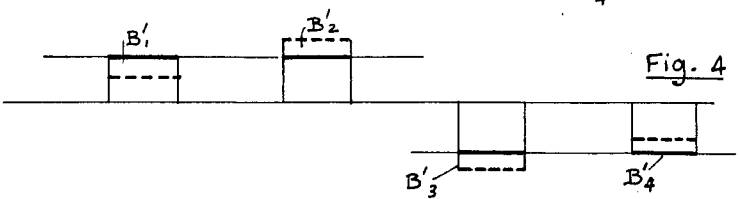
Figure 4:
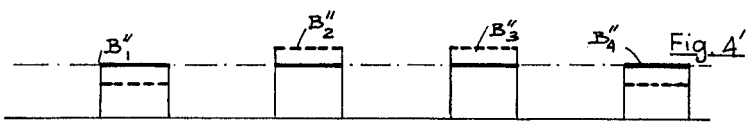
Figure 5:
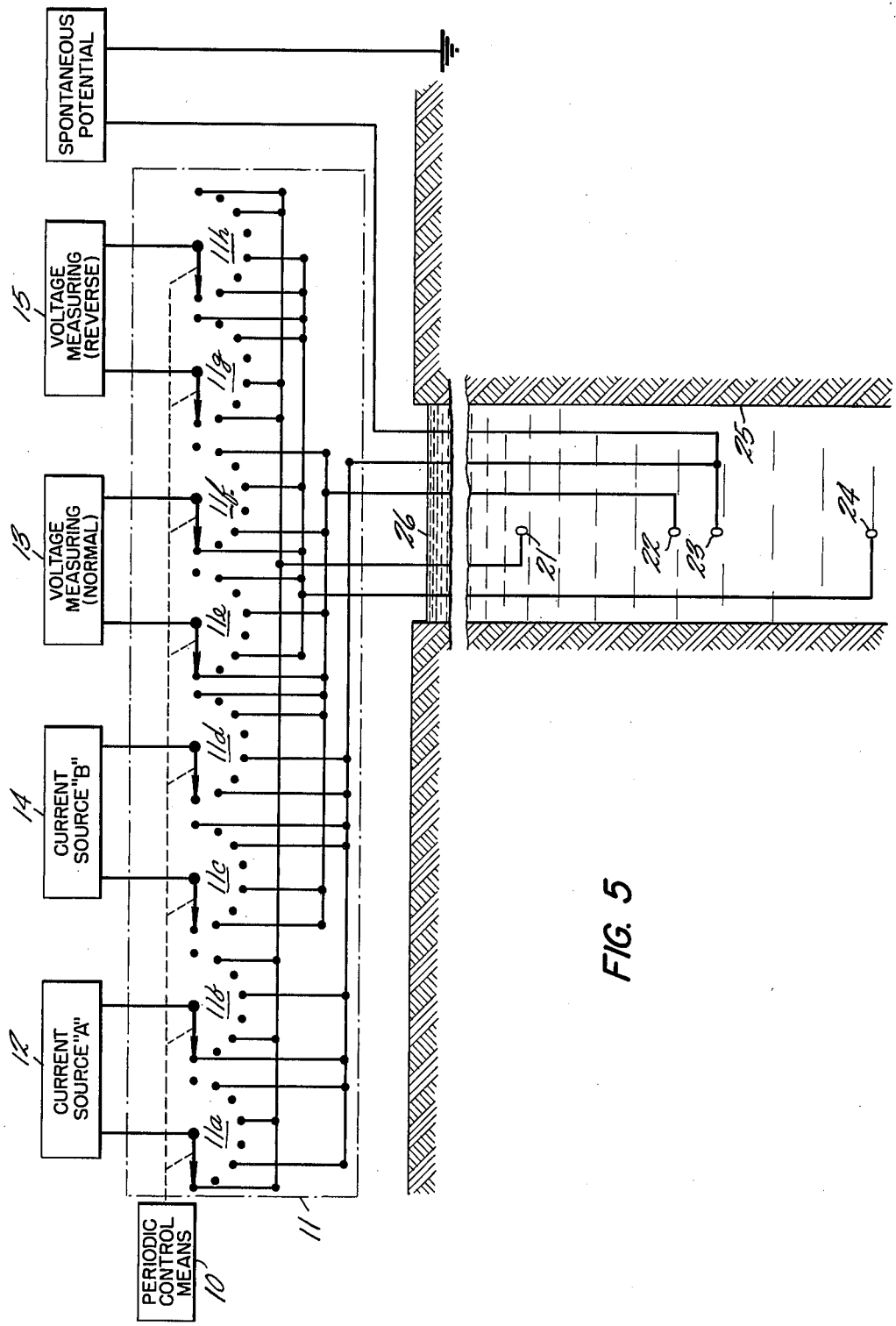

The foregoing and other objects, features and advantages of the present invention will become more apparent from the following more detailed description thereof when taken in conjunction with the accompanying drawings, in which:

FIGURES 1, 2 and 2' are waveforms illustrating the operation of conventional systems;

FIGURES 3, 4 and 4' are waveforms illustrating the improved operation according to the present invention; and, FIGURE 5 illustrates a conventional switching arrangement and electrode system adapted to provide the operation of the present invention.

As indicated hereinabove, conventional resistivity measuring systems are effective to balance out the spontaneous potentials generated in the bore hole by virtue of the switching of polarities of the current pulses and voltage measured. Accordingly, in the ensuing description, it will be assumed that the spontaneous potentials have been compensated for and their effects are not illustrated in the waveform diagrams.

FIGURE 1 illustrates the waveforms of the current pulses as applied to a conventional system of four electrodes providing both normal and lateral probe measurements. The pulses $A_1$ and $A_2$ of FIGURE 1 correspond to the alternate polarity current pulses used with the electrodes connected in the reversed or lateral arrangement, while the pulses $B_1$ and $B_2$ represent the alternately opposite pulses provided with the electrodes connected in the normal probe arrangement. As can be seen, in both the normal and reversed probe arrangements, the current pulses alternate in direction during each cycle of operation.

FIGURE 2, only the voltage measurements corresponding to the normal probe operation of the apparatus are shown, for the sake of clarity, and it will be realized that a similar set of voltage measurements will be available for the reversed probe operation. The voltage pulses are indicated as having values of $B_1'$ and $B_2'$ respectively, corresponding to the solid line of the pulse waveforms. The dotted lines across the voltage pulses of the figure represent the effect of the residual potential described above and which in this case are caused by the previously generated reversed probe current pulses $A_1$, $A_2$, respectively. As indicated in the figure, the residual potentials tend to decrease the magnitudes of the measured pulses in both the positive and negative directions.

The voltages of FIGURE 2, as actually measured on the indicating instruments, are illustrated in FIGURE 2'. As is well understood, the rectification action of the commutator used in conventional switching systems supplies all of the voltage pulses to the measuring instrument in the same polarity. As a result of the influence of the residual potentials, the voltage level measured by the indicator is represented by the dotted line in the figure, which is somewhat less than the otherwise expected magnitude. The value of this reduction in potential is indicated as $B_1''$ and $B_2''$, respectively, for each of the two pulses shown.

The effects of the residual potentials have been discussed hereinabove in terms of their effect on the normal probe measurements made in a conventional system. For purposes of illustration and to indicate that the method of the present invention is applicable both to normal and reversed probe measurements, the following description will be in terms of the effect of the residual potentials on the reversed probe measurements, the residual potentials arising from previously generated normal probe current pulses.

Referring now to FIGURE 3, which illustrates one cycle of the current pulses provided in accordance with the present invention, the pulses generated with the electrodes in the normal probe arrangement are shown in conventional fashion as alternately opposite polarity pulses $A_1$, $A_2$, $A_3$, $A_4$. The pulses provided for the reversed probe measurement however, differ from conventional operation. As seen from the figure, these pulses comprise a pair of pulses $B_1$, $B_2$, of the same polarity, each interposed between a consecutive pair of opposite polarity normal pulses, and a second pair of pulses $B_3$, $B_4$, of opposite polarity to the first pair but similarly disposed between alternate polarity pulses of the normal probe arrangement.

FIGURE 4 illustrates the voltages generated across the measuring electrodes of the system during the reversed probe measurements. Since, as discussed above, the residual potentials result from the delayed effects of the current pulse previously applied to the strata, and since the previous pulses in this embodiment are the alternately opposite polarity normal probe pulses, it will be realized that the sense or direction of the residual potentials will be likewise alternately opposite in sign. This is shown in FIGURE 2. In accordance with the invention, however, since consecutive reversed probe current pulses, and consequently the measured voltages, are in the same polarity, the effect of the residual potentials thereon will be to respectively subtract from and add to consecutive measured boltages. In FIGURE 4, this is represented by the areas $B_1'$ and $B_2'$, respectively below and above the expected value of voltage. The same result occurs in the second half of the pulse cycle. Thus the voltages $B_3'$ and $B_4'$ are respectively subtracted from and added to the values of the negative pulses in FIGURE 4.

When the pulses are rectified by the commutator action for application to the indicator, the waveforms of FIGURE 4' result. As illustrated therein, each consecutive pair of measured voltages balances out or compensates for the residual potentials and over the complete cycle shown, the net effect of the residual potential portions $B_1''$, $B_2''$, $B_3''$ and $B_4''$, is effectively zero. Thus, by means of the unique method of the present invention, the error producing residual potentials are effectively balanced out and do not affect the measurement.

A suitable switching arrangement for producing the method described above is shown in FIGURE 5. As is apparent from the figure, the apparatus consists merely of an adaptation of a simple ganged switch, such as shown in the aforementioned Doll patent, to effect the current pulse generating scheme illustrated in FIGURE 3. From FIGURE 3, it will be obvious that such apparatus must include a pair of current pulse sources, 12, 14, and a pair of voltage measuring means, 13, 15, coupled through the switching means 11 to the conventional four electrodes 21, 22, 23 and 24 of the measuring system. The switching means 11 is actuated by suitable control means 10. It is believed obvious to one skilled in the art to design such a switching arrangement once the pulse sequence of FIGURES 3 and 4 are made known, and the arrangement shown in FIGURE 5 is intended to be merely illustrative of one simple type of such arrangement. As shown, a means to measure the spontaneous potential generated in the bore hole may also be coupled to one of the electrodes, in well known fashion.

It will be realized from the foregoing description that the novel method of the invention may be applied equally as well to the measurements made in the normal probe arrangement, merely by adjusting the polarities of the current pulses in accordance with the teaching herein. Moreover, it will be apparent that the novel concept disclosed may be applied to systems of more than two electrode arrangements. Obviously, the teachings of the present invention may also be applied to measurements made other than in a bore hole, such as in electrical prospecting conducted at ground level. Accordingly, the invention is to be limited only as indicated by the scope of the appended claims.

I claim:

1. A method for the remote measuring of resistivity of formations surrounding a borehole comprising the steps of producing and applying to said formations a first train of periodically occurring electrical current pulses, the pulses of said first train being directed alternatingly in both directions and separated from each other by an interval, producing and applying to said formations a second train of periodically occurring electrical current pulses, said second train of pulses comprising sequentially two pulses of one direction followed by two pulses of a direction opposite to said one direction, the respective successive pulses of said second train being applied to said formations during respective successive intervals between the pulses of said first pulse train, and measuring the voltages produced in said formations by the current pulses of said second train.

2. A method for the remote measuring of resistivity of earth formations surrounding a borehole comprising the steps of producing and applying to said formations a first train of periodically occurring electrical current pulses of substantially equal magnitude, the pulses of said first train being directed alternatingly in both directions and separated from each other by an interval, producing and applying to said formations a second train of periodically occurring electrical current pulses of substantially equal magnitude, said second train of pulses comprising sequentially two pulses of one direction followed by two pulses of a direction opposite to said one direction, the respective successive pulses of said second train being applied to said formations during respective successive intervals between the pulses of said first pulse train, and measuring the voltages produced in said formations by the current puses of said second train.

3. A method of geophysical prospecting within a bore hole in which both normal and lateral probe measurements are alternately taken, comprising the steps of generating and applying to the formations adjacent the borehole current pulses corresponding to one of said measurements in alternately opposite polarities, generating and applying to said formations current pulses corresponding to the other of said measurements in pairs of the same polarity, successive pairs being of opposite polarity, each individual pulse of each of said pairs being applied to said formations between successive opposite polarity pulses corresponding to said one of said measurements, and measuring the voltages produced in said formations by the current pulses corresponding to said other of said measurements.

4. A method of logging a fluid-filled borehole such that normal and lateral probe electrical logging operations can be performed effectively simultaneously, comprising the steps of generating and applying to the formations surrounding said borehole to effect said first logging operation a first series of equal amplitude current pulses separated from each other by intervals of time, said first pulses being in alternately opposite directions, whereby voltages characterizing said first logging operation are produced, and supplying to a second pair of said electrodes arranged to effect said lateral logging operation a second series of current pulses, said second pulses being respectively supplied during said intervals of time separating said first pulses and comprising sequentially two pulses of one direction followed by two pulses of the opposite direction, each of the even-numbered pulses of said first series being inserted between two pulses of said second series of the same direction, and each of the odd-numbered pulses of said first series being inserted between two pulses of said second series of opposite directions, whereby voltages characterizing said lateral logging operation are produced, and measuring the voltages produced in said formations by the current pulses effecting said lateral logging operation.

References Cited by the Examiner
UNITED STATES PATENTS

| 2,937,333 | 5/1960 | Boucherot | 324—1 |
| 2,986,693 | 5/1961 | Alder | 324—1 |

WALTER L. CARLSON, *Primary Examiner.*

JAMES W. LAWRENCE, FREDERICK M. STRADER,
*Examiners.*

UNITED STATES PATENT OFFICE
CERTIFICATE OF CORRECTION

Patent No. 3,219,921            November 23, 1965

Joseph Marie Bricaud

It is hereby certified that error appears in the above numbered patent requiring correction and that the said Letters Patent should read as corrected below.

Column 4, line 20, for "boltages" read -- voltages --; column 6, lines 10 and 14, for "first", each occurrence, read -- normal --; lines 15 and 16, for "and supplying to a second pair of said electrodes arranged" read -- generating and applying to the formations surrounding said borehole --.

Signed and sealed this 20th day of September 1966.

(SEAL)
Attest:

ERNEST W. SWIDER            EDWARD J. BRENNER
Attesting Officer            Commissioner of Patents